(12) United States Patent
Suciu et al.

(10) Patent No.: US 10,309,310 B2
(45) Date of Patent: Jun. 4, 2019

(54) TWO SPOOL GAS GENERATOR WITH IMPROVED AIR PORTING

(71) Applicant: UNITED TECHNOLOGIES CORPORATION, Hartford, CT (US)

(72) Inventors: Gabriel L. Suciu, Glastonbury, CT (US); Jesse M. Chandler, South Windsor, CT (US); Wesley K. Lord, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 541 days.

(21) Appl. No.: 14/758,277

(22) PCT Filed: May 10, 2013

(86) PCT No.: PCT/US2013/040493
§ 371 (c)(1),
(2) Date: Jun. 29, 2015

(87) PCT Pub. No.: WO2014/109786
PCT Pub. Date: Jul. 17, 2014

(65) Prior Publication Data
US 2015/0337738 A1    Nov. 26, 2015

Related U.S. Application Data

(60) Provisional application No. 61/751,048, filed on Jan. 10, 2013.

(51) Int. Cl.
*F02C 6/08*    (2006.01)
*F02C 7/18*    (2006.01)
(Continued)

(52) U.S. Cl.
CPC ............... *F02C 7/185* (2013.01); *F02C 3/13* (2013.01); *F02C 3/145* (2013.01); *F02C 6/04* (2013.01);
(Continued)

(58) Field of Classification Search
CPC ...... F02C 6/08; F02C 6/04; F02C 6/06; F02C 7/185; F02C 9/18; F02C 3/10; F02C 3/13;
(Continued)

(56) References Cited

U.S. PATENT DOCUMENTS

| | | | | |
|---|---|---|---|---|
| 3,368,352 A | * | 2/1968 | Colin | F02K 3/025 60/224 |
| 4,765,135 A | * | 8/1988 | Lardellier | F01D 5/03 416/127 |

(Continued)

FOREIGN PATENT DOCUMENTS

| | | |
|---|---|---|
| WO | 2014092777 A1 | 6/2014 |
| WO | 2014092778 A1 | 6/2014 |
| WO | 2014109786 A1 | 7/2014 |

OTHER PUBLICATIONS

Replacement Supplementary European Search Report for European Application No. 13870920.9 completed dated Mar. 9, 2016.
(Continued)

*Primary Examiner* — Andrew H Nguyen
(74) *Attorney, Agent, or Firm* — Carlson, Gaskey & Olds, P.C.

(57) ABSTRACT

In a featured embodiment, a gas turbine engine has a first compressor rotor driven by a first turbine rotor, and a second compressor rotor driven by a second turbine rotor. The second compressor rotor is upstream of the first compressor rotor and the first turbine rotor is upstream of the second turbine rotor. An air mixing system taps air from a location
(Continued)

upstream of the first compressor rotor for delivery to an environmental control system. The air mixing system receives air from a first air source and a second air source. The first air source includes air at a first pressure upstream of the first compressor rotor. The second air source includes air at a lower second pressure. At least one valve controls a mixture of air from the first and second sources to achieve a predetermined pressure for the environmental control system.

17 Claims, 3 Drawing Sheets

(51) Int. Cl.
| | |
|---|---|
| *F02K 3/02* | (2006.01) |
| *F02K 3/00* | (2006.01) |
| *F02C 9/18* | (2006.01) |
| *F02C 3/13* | (2006.01) |
| *F02C 3/14* | (2006.01) |
| *F02C 6/04* | (2006.01) |

(52) U.S. Cl.
CPC ................. *F02C 6/08* (2013.01); *F02C 9/18* (2013.01); *F02K 3/00* (2013.01); *F02K 3/02* (2013.01); *F05D 2220/3217* (2013.01); *F05D 2220/3218* (2013.01)

(58) Field of Classification Search
CPC .... B64D 2013/0618; B64D 2013/0603; F02K 3/06; F02K 3/062; F02K 3/065
See application file for complete search history.

(56) References Cited

U.S. PATENT DOCUMENTS

| | | | | |
|---|---|---|---|---|
| 5,442,905 | A | * 8/1995 | Claeys | ................. B64D 13/06 454/71 |
| 6,082,967 | A | 7/2000 | Loisy | |
| 6,189,324 | B1 | * 2/2001 | Williams | ............... B64D 13/06 62/172 |
| 6,305,156 | B1 | * 10/2001 | Lui | ....................... B64D 13/06 454/76 |
| 2005/0060983 | A1 | 3/2005 | Lardellier | |
| 2005/0235651 | A1 | 10/2005 | Morris et al. | |
| 2007/0234702 | A1 | * 10/2007 | Hagen | ................... B60H 1/032 60/39.01 |
| 2009/0285680 | A1 | * 11/2009 | Hess | ...................... F01D 5/081 416/1 |
| 2010/0037623 | A1 | 2/2010 | Jewess et al. | |
| 2010/0132367 | A1 | * 6/2010 | Brogren | ............... F01D 17/105 60/785 |
| 2011/0056208 | A1 | 3/2011 | Norris et al. | |
| 2011/0268563 | A1 | * 11/2011 | Stretton | .................. F01D 25/12 415/179 |
| 2012/0186267 | A1 | 7/2012 | Coffinberry et al. | |

OTHER PUBLICATIONS

International Preliminary Report on Patentability for International Application No. PCT/US2013/040493 dated Jul. 23, 2015.
International Search Report and Written Opinion for PCT Application No. PCT/US2013/040493, dated Feb. 24, 2014.
Supplementary European Search Report for European Application No. 13870920.9 completed Dec. 22, 2015.

* cited by examiner

TWO SPOOL GAS GENERATOR WITH IMPROVED AIR PORTING

BACKGROUND

This application relates to a two spool gas generator for a gas turbine engine and a propulsor drive having improved porting for air to be utilized on an aircraft.

Conventional gas turbine engines typically include a fan section, a compressor section and a turbine section. There are two general known architectures. In one architecture, a low speed spool includes a low pressure turbine driving a low pressure compressor and also driving a fan. A gear reduction may be placed between the spool and the fan in some applications. There are also direct drive engines.

Another known architecture includes a third spool with a third turbine being positioned downstream of the low pressure turbine and driving the fan. The three spools have shafts connecting a turbine to the driven element, and the three shafts are mounted about each other.

All of these architectures raise challenges.

When gas turbine engines are utilized on an aircraft, the compressor is typically utilized to supply air for aircraft uses. As an example, cabin air supply systems typically tap air from a higher pressure compressor. A number of applications are typically provided, resulting in a good deal of plumbing, valves, etc.

Another challenge is that the pressure of the air supplied by an engine compressor will vary during operation of the associated aircraft.

SUMMARY

In a featured embodiment, a gas turbine engine has a first compressor rotor driven by a first turbine rotor, and a second compressor rotor driven by a second turbine rotor. The second compressor rotor is upstream of the first compressor rotor and the first turbine rotor is upstream of the second turbine rotor. An air mixing system taps air from a location upstream of the first compressor rotor for delivery to an environmental control system. The air mixing system receives air from a first air source and a second air source. The first air source includes air at a first pressure upstream of the first compressor rotor. The second air source includes air at a lower second pressure. At least one valve controls a mixture of air from the first and second sources to achieve a predetermined pressure for the environmental control system.

In another embodiment according to the previous embodiment, the second compressor rotor has a first overall pressure ratio, and the first compressor rotor has a second overall pressure ratio. A ratio of the first overall pressure ratio to the second overall pressure ratio is greater than or equal to about 2.0.

In another embodiment according to any of the previous embodiments, the ratio of the first overall pressure ratio to the second overall pressure ratio is greater than or equal to about 3.0.

In another embodiment according to any of the previous embodiments, the ratio of the first overall pressure ratio to the second overall pressure ratio is greater than or equal to about 3.5.

In another embodiment according to any of the previous embodiments, the ratio of the first overall pressure ratio to the second overall pressure ratio is less than or equal to about 8.0.

In another embodiment according to any of the previous embodiments, a propulsor turbine is positioned downstream of the second turbine rotor.

In another embodiment according to any of the previous embodiments, the propulsor turbine drives a propeller.

In another embodiment according to any of the previous embodiments, the propulsor turbine drives a fan at an upstream end of the engine.

In another embodiment according to any of the previous embodiments, an axially outer position is defined by the fan. The propulsor turbine is positioned between the fan and the first and second turbine rotors. The first and second compressor rotors are positioned further into the engine relative to the first and second turbine rotors.

In another embodiment according to any of the previous embodiments, the second air source is positioned to be upstream of the second compressor rotor.

In another embodiment according to any of the previous embodiments, the second air source delivers air across a heat exchanger, and includes a particle separator for separating impurity.

In another embodiment according to any of the previous embodiments, the second air source communicates through a conduit to a connection leading into the mixing box. The second air source further selectively communicates with an outlet is associated with the first compressor rotor.

In another embodiment according to any of the previous embodiments, the second air source communicates from a single conduit through a port leading into a mixing box and, alternatively, flowing to the outlet at the first compressor rotor.

In another embodiment according to any of the previous embodiments, the second air source communicates into a branch of two lines, with the first line including a valve control to control the amount of air reaching the mixing box, and a second valve on a second line leading to the outlet.

In another embodiment according to any of the previous embodiments, the at least one valve is a pair of valves associated with the supply port from the first air source, and also on the second air source.

In another embodiment according to any of the previous embodiments, the location upstream of the first compressor rotor is in an intermediate case intermediate the first and second compressor rotors.

In another featured embodiment, a gas turbine engine has a first shaft connecting a first compressor rotor to be driven by a first turbine rotor, and a second shaft connecting a second compressor rotor to be driven by a second turbine rotor. The second compressor rotor is upstream of the first compressor and the first turbine rotor is upstream of the second turbine rotor. An air mixing system taps air from a location upstream of the first compressor rotor for delivery to an environmental control system. The air mixing system receives air from a first air source and a second air source. The first air source includes air at a first pressure upstream of the first compressor rotor. The second air source includes air at a lower second pressure. At least one valve controls a mixture of air from the first and second sources to achieve a predetermined pressure for the environmental control system. A propulsor turbine outwardly connects to drive one of a fan or propeller through a third shaft. The first shaft surrounds the second shaft, but the first and second shafts do not surround the third shaft. The second compressor rotor has a first overall pressure ratio. The first compressor rotor has a second overall pressure ratio. A ratio of the first overall pressure ratio to the second overall pressure ratio is greater than or equal to about 2.0. The source of lower pressure air is positioned to be upstream of the second compressor rotor.

In another embodiment according to the previous embodiment, the second air source communicates through a conduit to a connection leading into a mixing box. The second air source further selectively communicates with an outlet which is associated with the first compressor rotor.

In another embodiment according to any of the previous embodiments, the at least one valve is a pair of valves associated with a supply port for the first air source, and also on the supply of the lower pressure air.

In another embodiment according to any of the previous embodiments, the first air source is in an intermediate case intermediate the first and second compressor rotors.

These and other features may be best understood from the following drawings and specification.

DETAILED DESCRIPTION

Figure 1:
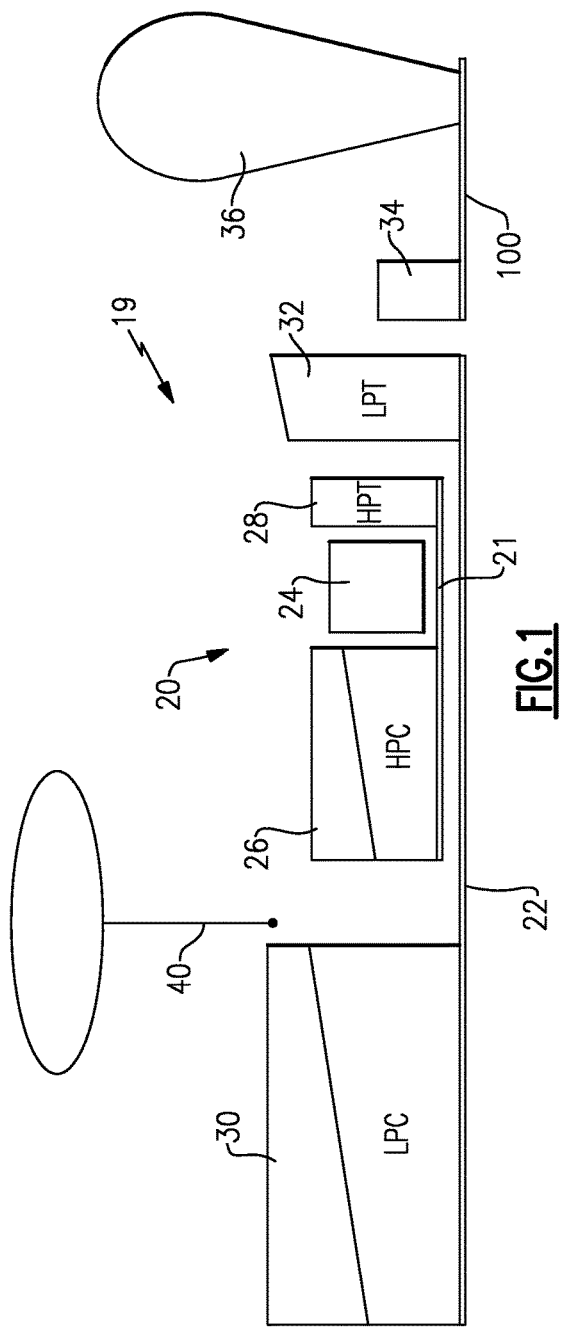
FIG. 1 schematically shows a three spool gas turbine engine.

A gas turbine engine 19 is schematically illustrated in FIG. 1. A core engine, or gas generator 20, includes high speed shaft 21 is part of a high speed spool along with a high pressure turbine rotor 28 and a high pressure compressor rotor 26. A combustion section 24 is positioned intermediate the high pressure compressor rotor 26 and the high pressure turbine rotor 28. A shaft 22 of a low pressure spool connects a low pressure compressor rotor 30 to a low pressure turbine rotor 32.

Engine 19 also includes a free turbine 34 is shown positioned downstream of the low pressure turbine rotor 32 and serves to drive a propeller 36.

Various embodiments are within the scope of the disclosed engine. These include embodiments in which:

a good deal more work is down by the low pressure compressor rotor 30 than is done by the high pressure compressor rotor 26;

the combination of the low pressure compressor rotor 30 and high pressure compressor rotor 26 provides an overall pressure ratio equal to or above about 30;

the low pressure compressor rotor 30 includes eight stages and has a pressure ratio at cruise conditions of 14.5;

the high pressure compressor rotor 26 had six stages and an overall pressure ratio of 3.6 at cruise;

a ratio of the low pressure compressor pressure ratio to the high pressure compressor ratio is greater than or equal to about 2.0, and less than or equal to about 8.0;

more narrowly, the ratio of the two pressure ratios is between or equal to about 3.0 and less than or equal to about 8;

even more narrowly, the ratio of the two pressure ratios is greater than about 3.5.

In the above embodiments, the high pressure compressor rotor 26 will rotate at slower speeds than in the prior art. If the pressure ratio through the fan and low pressure compressor are not modified, this could result in a somewhat reduced overall pressure ratio. The mechanical requirements for the high pressure spool, in any event, are relaxed.

With the lower compressor, the high pressure turbine rotor 28 may include a single stage. In addition, the low pressure turbine rotor 32 may include two stages.

By moving more of the work to the low pressure compressor rotor 30, there is less work being done at the high pressure compressor rotor 26. In addition, the temperature at the exit of the high pressure compressor rotor 26 may be higher than is the case in the prior art, without undue challenges in maintaining the operation.

A bleed line or port 40 is positioned between the low pressure compressor rotor 30 and the high pressure compressor rotor 26. Details of this porting are disclosed below.

Variable vanes are less necessary for the high pressure compressor rotor 26 since it is doing less work. Moreover, the overall core size of the combined compressor rotors 30 and 26 is reduced compared to the prior art.

Figure 2:
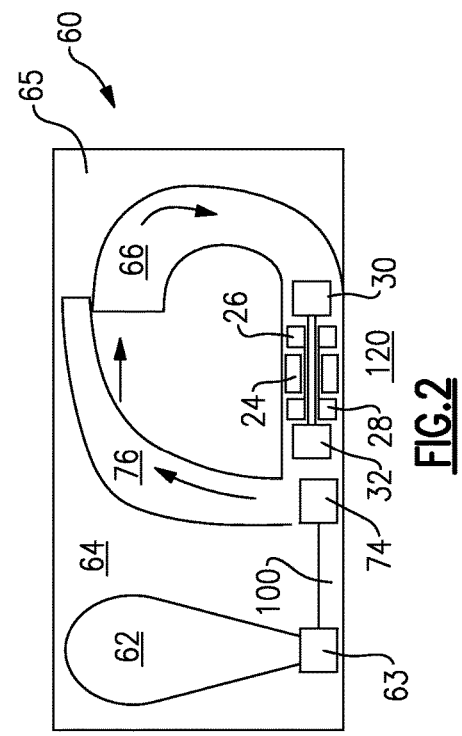
FIG. 2 shows a second embodiment.

The engine 60 as shown in FIG. 2 includes a two spool core engine 120 including a low pressure compressor rotor 30, a low pressure turbine rotor 32, a high pressure compressor rotor 26, and a high pressure turbine rotor 28, and a combustor 24 as in the prior embodiments. This core engine 120 is a so called "reverse flow" engine meaning that the compressor 30/26 is spaced further into the engine than is the turbine 28/32. Air downstream of the fan rotor 62 passes into a bypass duct 64, and toward an exit 65. However, a core inlet duct 66 catches a portion of this air and turns it to the low pressure compressor 30. The air is compressed in the compressor rotors 30 and 26, combusted in a combustor 24, and products of this combustion pass downstream over the turbine rotors 28 and 32. The products of combustion downstream of the turbine rotor 32 pass over a fan drive turbine 74. Then, the products of combustion exit through an exit duct 76 back into the bypass duct 64 (downstream of inlet 66 such that hot gas is not re-ingested into the core inlet 65), and toward the exit 65. A gear reduction 63 may be placed between the fan drive turbine 74 and fan 62.

The core engine 120, as utilized in the engine 60, may have characteristics similar to those described above with regard to the core engine 20.

The engines 19 and 60 are similar in that they have what may be called a propulsor turbine (34 or 74) which is spaced to be axially downstream of the low pressure turbine rotor 32. Further, the high pressure spool radially surrounds the low pressure spool, but neither of the spools surround the propulsor turbine, nor the shaft 100 connecting the propulsor turbine to the propellers 36 or fan 62. In this sense, the propulsor rotor is separate from the gas generator portion of the engine.

The disclosed engine architecture creates a smaller core engine and yields higher overall pressure ratios and, therefore, higher performance. Further, uncoupling the low pressure turbine 32 from driving a fan 62 or prop 36 enables it to run at a lower compressor surge margin, which also increases efficiency. Moreover, shaft diameters can be decreased and, in particular, for the diameter of the low pressure shafts as it is no longer necessary to drive the fan 62 or prop 36 through that shaft.

In the prior art, the ratio of the low pressure compressor pressure ratio to the high pressure compressor ratio was generally closer to 0.1 to 0.5. Known three spool engines have a ratio of the low pressure compressor pressure ratio to the high pressure compressor ratio of between 0.9 and 3.0.

Figure 3:
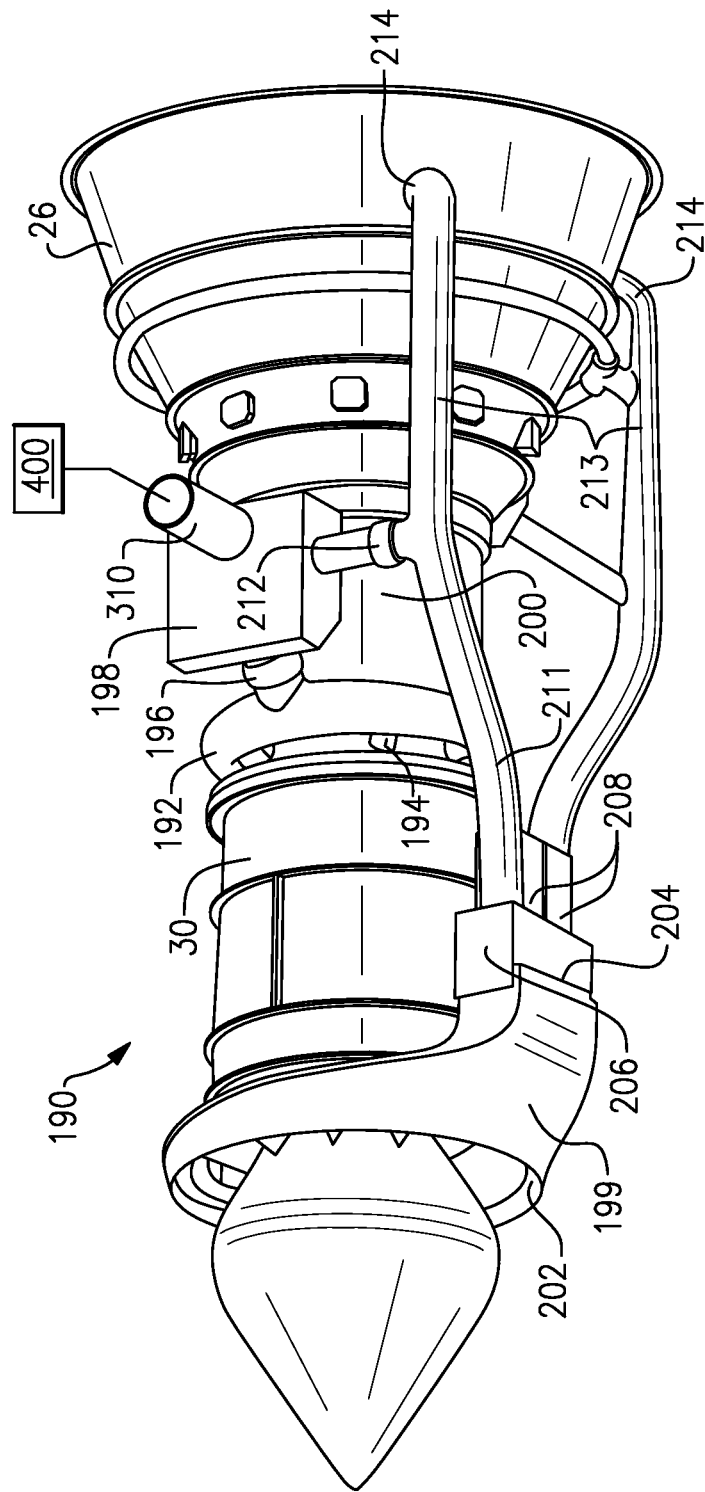
FIG. 3 shows a first embodiment air supply system.
Figure 4:
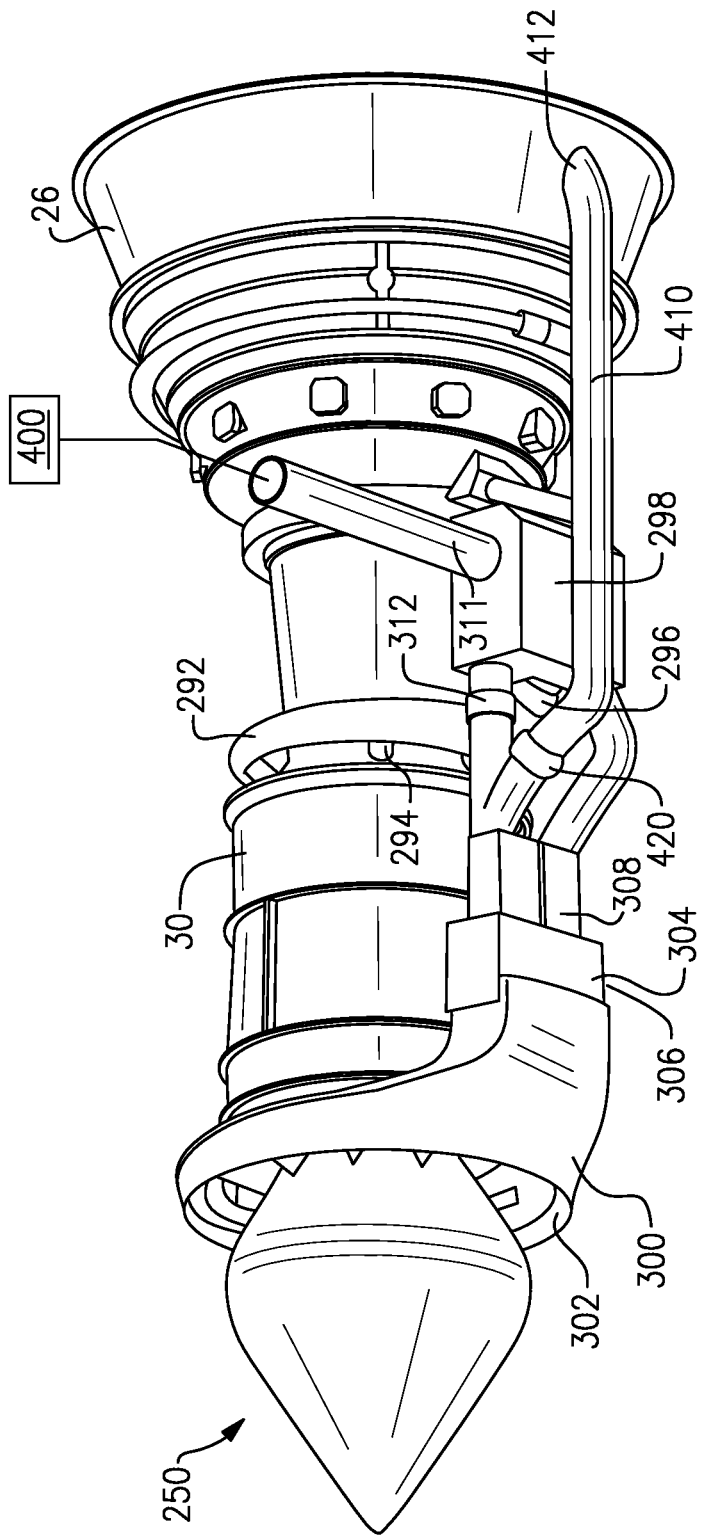
FIG. 4 shows a second embodiment.

Further details of the bleed line or port 40 and an associated air supply system are shown in FIGS. 3 and 4.

Particularly with an engine as disclosed above, the low pressure compressor 30 is supplying a higher pressure than is typically been the case in the past. As such, this compressor can be utilized as a source of air for environmental control systems on an associated aircraft. In the past, a higher pressure source has typically been required resulting in taps from the high pressure compressor.

As shown in FIG. 3, an air supply system 190 incorporates a manifold 192 provided with a plurality of bleed lines or ports 194 and which communicate with an intermediate compressor case 200. The intermediate compressor case 200 is positioned between the low pressure compressor 30 and the high pressure compressor 26.

The pressure of the air supplied by the low pressure compressor 30 will vary dramatically during operation of an associated engine. Thus, at some point, the air pressure delivered from the ports 194 may be undesirably high.

A supply of lower pressure air is used to address this concern. An inlet 202 to a low pressure manifold 199 communicates through a heat exchanger 206. The heat exchanger 206 may be utilized to cool oil at other locations. A particle separator 204 is positioned to filter dirt particles out of an air supply stream being delivered downstream through fans 208 to an air supply line 211. Air supply line 211 may communicate through a valve 212 to a mixing box 198. The valve 212 is controlled in combination with a valve 196 associated with the manifold 192, such that the flow of air from the higher pressure manifold 192 and the lower pressure source 211, are properly mixed to achieve a desired pressure at an outlet 310. The outlet 310 leads to an environmental control system 400 for supplying air for use on an associated aircraft.

A control, such as a full authority digital engine control, may control the valves 196 and 212, based upon the pressure, temperature and any other variables within the operation of the associated engine.

A worker of ordinary skill in the art would recognize how to achieve a desired pressure at the outlet 310. The desired pressure at the outlet 310 may be dictated by the aircraft manufacturer.

When the valve 212 is open, air flows from the source 211 through the mixing box 198. However, as the valve 212 is moved toward a more closed position, that air is delivered through an outlet 214 downstream of the high pressure compressor 26.

FIG. 4 shows an alternative embodiment 250. Alternative embodiment 250 is generally the same as the embodiment 190. An inlet 302 leads into a low pressure supply manifold 300. There is a dirt separator 304, a heat exchanger 306 and fans 308. Valves 312 and 296 are controlled to control the pressure of the air reaching a mixing box 298 which communicates with an outlet 311, and eventually the environmental control system 400. A pipe 410 communicating a lower pressure air supply into the mixing box 298 passes air through a one-way valve 420 and to the outlet 412, similar to the first embodiment.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
   a first compressor rotor driven by a first turbine rotor, and a second compressor rotor driven by a second turbine rotor, with said second compressor rotor being upstream of the first compressor rotor and said first turbine rotor being upstream of said second turbine rotor;

an air mixing system for tapping air from a location upstream of said first compressor rotor and for delivery to an environmental control system, the air mixing system receiving air from a first air source and a second air source, the first air source including air at a first pressure upstream of said first compressor rotor, and the second air source including air at a lower second pressure upstream of said first air source, a first valve and a second valve, with said first valve controlling delivery of air from said first air source into a mixing box, and said second valve controlling delivery of air from said second air source into said mixing box;

said second valve controlling delivery of air at a lower pressure than said first valve such that the air from the second valve is delivered into the mixing box at a lower pressure than the air from the first valve;

wherein said first and second valves are controllable to achieve a predetermined pressure of a mixture of air from said first and second sources within said mixing box; and an outlet of said mixing box for delivery of said mixture of air to said environmental control system;

wherein said second air source communicating into a first line and a second line, with the first line including the second valve controlling the amount of air from said second air source reaching said mixing box, and the second line including a third valve controlling the amount of air passing to a second air source outlet downstream of said first compressor rotor.

2. The gas turbine engine as set forth in claim 1, wherein said second compressor rotor having a first overall pressure ratio, and said first compressor rotor having a second overall pressure ratio, with a ratio of said first overall pressure ratio to said second overall pressure ratio being greater than or equal to about 2.0, wherein said ratio of said first overall pressure ratio to said second overall pressure ratio being less than or equal to about 8.0.

3. The gas turbine engine as set forth in claim 2, wherein said ratio of said first overall pressure ratio to said second overall pressure ratio is greater than or equal to about 3.0.

4. The gas turbine engine as set forth in claim 3, wherein said ratio of said first overall pressure ratio to said second overall pressure ratio is greater than or equal to about 3.5.

5. The gas turbine engine as set forth in claim 1, wherein a propulsor turbine is positioned downstream of the second turbine rotor.

6. The gas turbine engine as set forth in claim 5, wherein the propulsor turbine drives a propeller.

7. The gas turbine engine as set forth in claim 5, wherein the propulsor turbine drives a fan at an upstream end of the engine.

8. The gas turbine engine as set forth in claim 7, wherein an axially upstream position is defined by said fan, and said propulsor turbine being positioned between said fan and said first and second turbine rotors, and said first and second compressor rotors being positioned further into said engine relative to said first and second turbine rotors.

9. The gas turbine engine as set forth in claim 1, wherein said second air source is positioned to be upstream of said second compressor rotor.

10. The gas turbine engine as set forth in claim 9, wherein said second air source delivers air across a heat exchanger, and includes a particle separator for separating impurities.

11. The gas turbine engine as set forth in claim 1, wherein said second air source communicates through a conduit to a connection leading into said mixing box, and said second air source further selectively communicating with the second air source outlet which is downstream of said first compressor rotor.

12. The gas turbine engine as set forth in claim 11, wherein said second air source communicates from the conduit through a port leading into said mixing box and, alternatively, flowing to said second air source outlet downstream of said first compressor rotor.

13. The gas turbine engine as set forth in claim 1, wherein said first and second valves are associated with a supply port from said first air source, and also on said second air source.

14. The gas turbine engine as set forth in claim 1, wherein said location upstream of said first compressor rotor is in an intermediate case intermediate said first and second compressor rotors.

15. A gas turbine engine comprising:
a first shaft connecting a first compressor rotor to be driven by a first turbine rotor, and a second shaft connecting a second compressor rotor to be driven by a second turbine rotor, with said second compressor rotor being upstream of the first compressor rotor and said first turbine rotor being upstream of said second turbine rotor; and
an air mixing system for tapping air from a location upstream of said first compressor rotor and for delivery to an environmental control system, the air mixing system receiving air from a first air source and a second air source, the first air source including air at a first pressure upstream of said first compressor rotor, and the second air source including air at a lower second pressure upstream of said first air source;
a propulsor turbine outwardly connected to drive one of a fan or propeller through a third shaft;
said first shaft surrounding said second shaft, but said first and second shafts not surrounding said third shaft;
said second compressor rotor having a first overall pressure ratio, and said first compressor rotor having a second overall pressure ratio, with a ratio of said first overall pressure ratio to said second overall pressure ratio being greater than or equal to about 2.0 and less than 8.0;
said second air source is positioned to be upstream of said second compressor rotor; and
a first valve and a second valve, with said first valve controlling delivery of air from said first air source into a mixing box, and said second valve controlling delivery of air from said second air source into said mixing box;
said second valve controlling delivery of air at a lower pressure than said first valve such that the air from the second valve is delivered into the mixing box at a lower pressure than the air from the first valve;
wherein said first and second valves are controllable to achieve a predetermined pressure for a mixture of air from said first and second sources within said mixing box;
and an outlet of said mixing box for delivery of said mixture of air to said environmental control system;
wherein said second air source communicating into a first line and a second line, with the first line including the second valve controlling the amount of air from said second air source reaching said mixing box, and the second line including a third valve controlling the amount of air passing to a second air source outlet downstream of said first compressor rotor.

16. The gas turbine engine as set forth in claim 15, wherein said second air source communicates through a conduit to a connection leading into said mixing box, and said second air source further selectively communicating with the second air source outlet which is downstream of said first compressor rotor.

17. The gas turbine engine as set forth in claim 15, wherein said first air source is in an intermediate case intermediate said first and second compressor rotors.

* * * * *